United States Patent [19]
Van Dest

[11] Patent Number: 5,263,905
[45] Date of Patent: Nov. 23, 1993

[54] ARRANGEMENT FOR DRIVING TWO WHEELS OF THE SAME AXLE IN ROTATION, WITH A REGULATION OF THEIR ROTATIONAL SPEEDS

[75] Inventor: Jean C. Van Dest, Saintry sur Seine, France

[73] Assignee: Glaenzer Spicer, Poissy, France

[21] Appl. No.: 856,487

[22] Filed: Mar. 24, 1992

[30] Foreign Application Priority Data

Mar. 29, 1991 [FR] France .................... 91 03910

[51] Int. Cl.$^5$ ............................................ F16H 47/00
[52] U.S. Cl. ................................... 475/89; 475/28
[58] Field of Search .................. 475/28, 85, 89, 92

[56] References Cited

U.S. PATENT DOCUMENTS

| | | | |
|---|---|---|---|
| 2,734,398 | 2/1956 | Bottcher | 475/89 |
| 3,520,376 | 7/1970 | Muller | 475/28 X |
| 3,601,211 | 8/1971 | Finke | 475/28 X |
| 3,818,782 | 6/1974 | Armasow | 475/28 X |
| 4,923,029 | 5/1990 | Lanzer | 475/89 X |

FOREIGN PATENT DOCUMENTS

| | | |
|---|---|---|
| 0283389 | 9/1988 | European Pat. Off. . |
| 0337356 | 10/1989 | European Pat. Off. . |
| 3820064 | 12/1989 | Fed. Rep. of Germany . |
| 881038 | 4/1942 | France . |
| 2122146 | 1/1984 | United Kingdom . |
| 2212230 | 7/1989 | United Kingdom . |

*Primary Examiner*—Dirk Wright
*Attorney, Agent, or Firm*—Harness, Dickey & Pierce

[57] ABSTRACT

The invention provides an arrangement for driving in rotation two transmission shafts (18) of a motor-driven road vehicle, each connected to a wheel of the same axle, characterised in that each of the two transmission shafts (18) is connected to the engine unit (10) of the vehicle by means of a device (22) allowing a variable slip between its input member (40) and its output member (36), and means for controlling the two variable-slip devices (22), which regulate the rotational speeds of the two transmission shafts in order to keep these speeds within a specific range of relative variation.

14 Claims, 2 Drawing Sheets

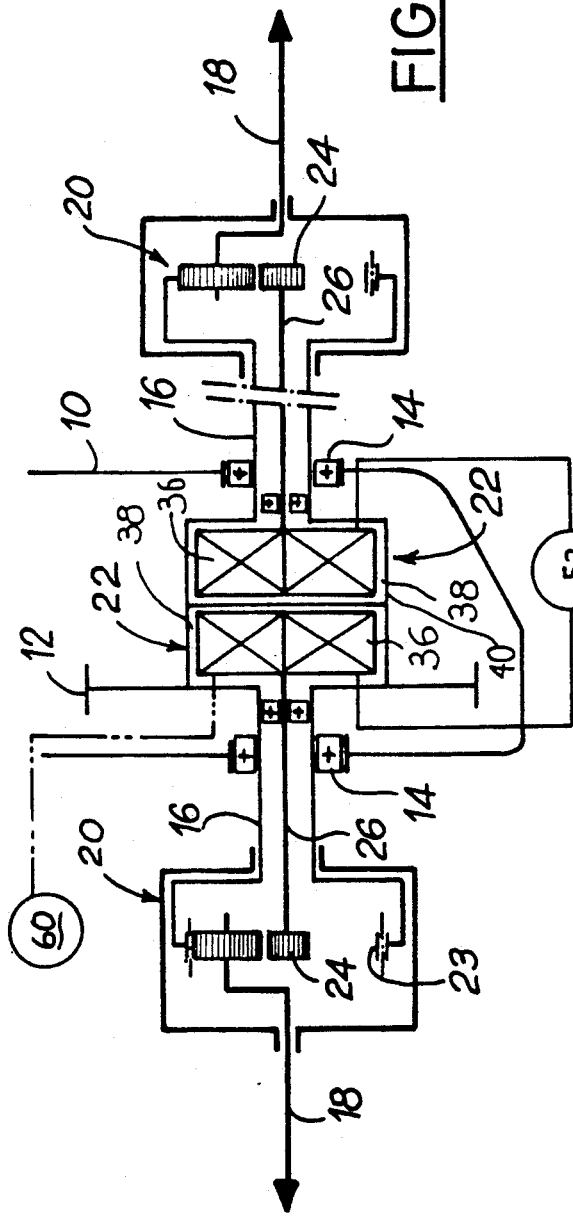
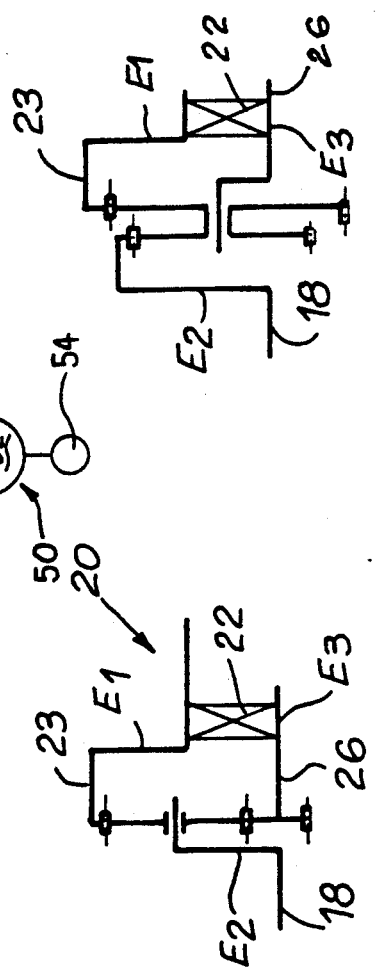
FIG. 3
FIG. 4
FIG. 5

ARRANGEMENT FOR DRIVING TWO WHEELS OF THE SAME AXLE IN ROTATION, WITH A REGULATION OF THEIR ROTATIONAL SPEEDS

The present invention relates to an arrangement for rotation two transmission shafts of a motor-driven road vehicle, each connected to a wheel of the same axle.

The invention relates particularly to an arrangement making it possible to perform a function of regulating the drive slip between the two wheels of the same axle.

The invention relates to a transmission arrangement which is used both for vehicles with two driving wheels of the front-drive or propulsion type and for vehicles with four driving wheels.

The range of relative variation of the speeds between the left and right wheels of the front and rear axles of a motor vehicle, which is necessary to ensure the advance of the motor vehicle in complete safety during its various movements, is low, that is to say of the order of 4% of the maximum rotational speed of the wheels.

The speed variation between the two wheels generally occurs as a result of the steering lock. The maximum angle of lock depends on the roadholding and the conditions of grip and on the parameters linked to the driving safety of the vehicle, particularly the visibility, thus giving rise to the need to provide a sufficient stopping distance.

This maximum angle of lock decreases as a function of the speed of advance of the vehicle.

The most general known design of a device for distributing the drive between the left and right wheels of the same axle of motor vehicle consists of a differential, by means of which the two transmission shafts are connected mechanically to one another and which distributes the drive torque between the left and right wheels according to a distribution ratio which is determined structurally. It is also known to provide the device making it possible to modify the distribution ratio temporarily.

The object of the invention is to provide an arrangement which makes it possible to carry out the distribution of the drive between the two wheels no longer on the basis of a torque distribution, but on the basis of a speed regulation.

To achieve this, the invention provides an arrangement of the abovementioned type, characterised in that each of the two transmission shafts is connected to the engine unit of the vehicle by means of a device allowing a variable slip between its input member and its output member, and means for controlling each of the two variable-slip devices, which regulate the rotational speeds of the two transmission shafts in order to keep these speeds within a specific range of relative variation.

According to other characteristics of the invention:
- each of the two transmission shafts is associated with an epicyclic train, a first element of which is connected to the engine unit and a second element of which is connected, on the one hand, directly to the transmission shaft and, on the other hand, to the third element of the epicyclic train by means of the variable-slip device;
- each of the variable-slip devices is a passive system;
- each of the variable-slip devices is an active system;
- the range of relative variation of the speeds is between 0 and 10% of the maximum rotational speed of the two transmission shafts.

Other characteristics and advantages of the invention will emerge from a reading of the following detailed description, for an understanding of which reference will be to the accompanying drawings in which :

FIG. 3 is a diagrammatic representation illustrating one embodiment of a transmission arrangement according to the invention; and FIGS. 4 and 5 are two diagrams illustrating preferred dispositions of the variable-slip device in association with an epicyclic train.

Figure 1:
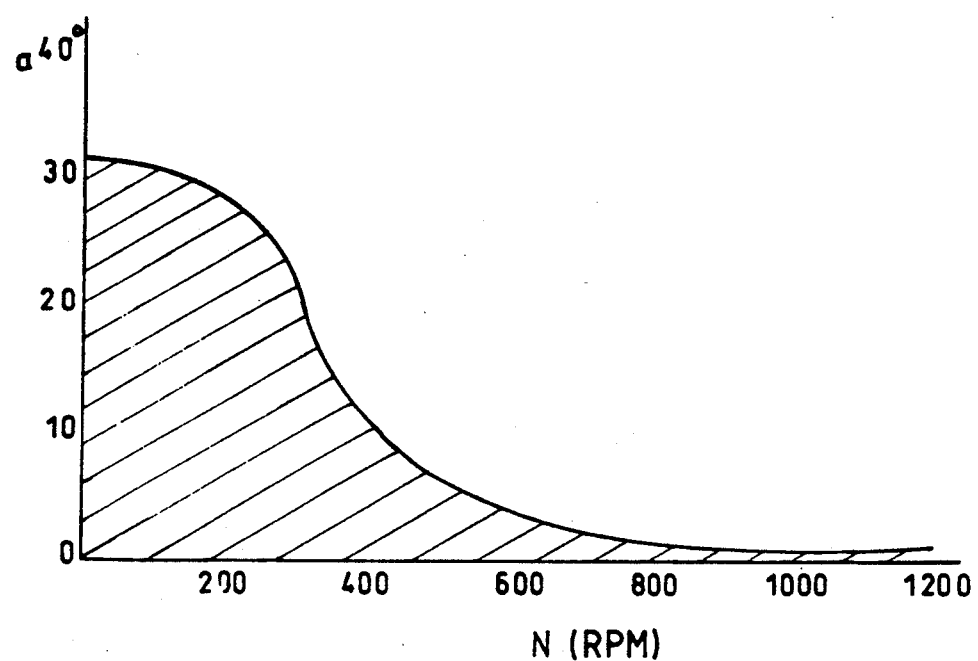
FIG. 1 is a diagram illustrating the angle of lock of a motor vehicle is a function of the rotational speed of the wheels.

The curve C illustrated in FIG. 1 is a result of a series of measurements made on a motor-driven road vehicle, showing the angle of lock "a", expressed in degrees, as a function of the mean rotational speed N of the wheels, expressed in revolutions per minute.

The hatched zone corresponds to the area of normal use of the vehicle.

Figure 2:
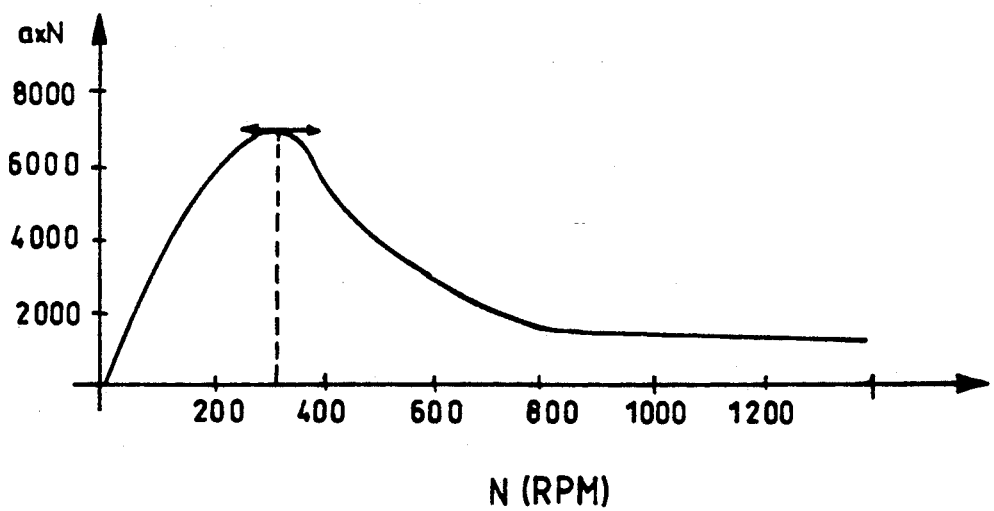
FIG. 2 is a curve illustrating the variation in the product of the angle of lock and of the mean rotational speed of the wheels as a function of this speed.

On the basis of the data illustrated in FIG. 1, it is possible to establish the curve of FIG. 2 which shows the trend of the product $a \times N$ as a function of the mean rotational speed of the wheels of the vehicle.

It can be seen that the product of the angle of lock "a" and of the means speed N passes through a maximum which corresponds to a mean rotational speed of between 200 and 400 revolutions per minute.

For this maximum of the product $a \times N$, the difference between the rotational speeds of the left and right wheels of the same axle is likewise at a maximum and is of the order of 60 revolutions per minute for a motor-driven road vehicle, of which the wheel base would be approximately 4 metres and the track approximately 2 metres.

Moreover, during most of the time of use of the road vehicle corresponding to its normal road movements, the value of the torques transmitted to the wheels is low. Combining this knowledge with the low variation of relative speeds between the left and right wheels makes it possible to conclude that the power required to ensure the control of the movement of the vehicle is low on average and is of the order of 2 to 3% of the maximum power of the vehicle.

The invention provides an arrangement for driving two wheels of the same axle in rotation, one embodiment of which is illustrated in FIG. 3.

FIG. 3 shows diagrammatically a portion 10 of a housing of the engine unit of the vehicle.

A ring gear 12 receiving the output movement of the gearbox is mounted rotatably in the housing 10 by means of bearings 14.

The ring gear 12 directly drives two hollow tubular shafts 16.

The function of each of the shafts 16 is to drive in rotation one of the two wheels (not shown) of the same axle of the vehicle.

The power transmission between the engine unit of the vehicle and each of the wheels is carried out according to the teachings of the invention.

The transmission arrangement will now be described with reference to the left-hand part of FIG. 3, the right-hand part being of symmetrical design for the drive of the other wheel.

The connection between the shaft 16 and the transmission shaft 18, which is itself connected to a wheel of the vehicle, is made by means of an epicyclic train 20 and a limited-slip device 22.

The hollow tubular shaft 16 is extended axially in order to form the external ring 23 of the epicyclic train 20.

The planet wheel 24 of the epicyclic train is connected to a drive shaft 26 coaxial with the shaft 16. The shaft 26 is itself connected to the output of the variable-slip device 22.

The variable-slip device 22 is, here, a passive device of the hydraulic vane-pump type, comprising a vane rotor 36 which rotates in a chamber 38 formed in the housing 40 and which is connected in terms of rotation to the ring 12.

The housing 40 is here common to the two devices 22.

The limited-slip device 22 therefore allows a relative rotational slip of the shaft 26 in relation to the ring 12, that is to say a relative rotational slip between the planet wheel and the external ring of the epicyclic train.

Means 50, shown schematically in FIG. 3, for controlling each of the two variable-slip devices perform the function of regulating the rotational speeds of the two transmission shafts 18 in order to keep them within the specific range of relative variation of these rotational speeds.

The control of the two devices 22 can be ensured by a device 52 of the pump-flow limiter type, controlled by an electronic regulating unit 54.

The transmission arrangement operates as follows.

When the vehicle advances in a straight line, whatever its speed of advance, the two wheels of the same axle rotate substantially at the same speed. The distribution of the torque between the two wheels takes place automatically by means of the controlled variable-slip devices 22.

When the vehicle travels on a bend, the rotational speeds of the two wheels are adjusted instantaneously as a function of the value of the lock imposed on the vehicle, that is to say as a function of the radius of curvature, without any spurious torque being transmitted to the steering of the vehicle. This adjustment takes place within the limits imposed by the control device of each of the two variable-slip devices 22.

In the event of a loss of grip of one of the two wheels, whether this phenomenon occurs in a straight line or on a bend, this wheel can skid only to the extent corresponding to the limit allowed by the control device of the devices 22.

Moreover, during the temporary skid phase, the torque continues to be transmitted to the other wheel.

In the embodiment illustrated in FIG. 3, the devices 22 are passive devices, that is to say devices requiring no introduction of power other than the drive power of the vehicle. Such a passive variable-slip device consists, for example, of a hydraulic pump, a compressor, a "viscodrive" device, a hydraulic multiple-disc coupler, etc.

It is also possible to provide variable-slip devices 22 of the active type, that is to say in which an additional power is introduced from an external source 60 as shown in phantom in FIG. 3. In this case, an active device consists, for example, of a hydraulic or electric motor.

The diagrams of FIGS. 4 and 5 illustrate two examples of the association of a variable-slip device 22 with an epicyclic train 20.

In view of the low value of the difference between the speeds of the left and right wheels and of the low value of the power required for regulating the speeds, epicyclic trains of the type illustrated in FIG. 4 and 5, in which the ratios E3/E1 and E3/E2 are low, can be used.

The transmission arrangement according to the invention, which comprises variable-slip devices, makes it possible not only to perform its function of regulating the drive slip, but also to ensure motoring of the type with an automatic gearbox for the lower gears and particularly for the first gear.

In fact, the arrangement according to the invention, with its control means, can enable the driver to control the advance of the vehicle at low speed and its holding at the fixed point directly from the accelerator.

Interposing the arrangement according to the invention, the inertia of which is low, between the two assemblies consisting of the engine unit and the wheel set of the vehicle, which each have a high inertia, also makes it possible to ensure a function of torsional damping in the transmission.

Where a vehicle with four driving wheels is concerned, the use of at least one arrangement according to the invention for transmission to the two driving wheels of one of the driving axles of the vehicle also makes it possible to ensure a torque distribution function between the two axles.

I claim:

1. An arrangement for driving in rotation two transmission shafts of a motor-driven road vehicle, each of said transmission shafts connected to a wheel of the same axle, said arrangement comprising: each of the two transmission shafts is connected to the engine unit of the vehicle by means of a device allowing a variable rotational slip between its input member and its output member, and means for independently controlling each of the two variable-slip devices which regulate the rotational speed of its respective transmission shaft in order to keep the relative variation between the speeds of the two transmission shafts within a specific range.

2. Arrangement according to claim 1, wherein each of the two transmission shafts is associated with an epicyclic train, a first element of which is connected to the engine unit and a second element of which is connected, on the one hand, directly to the transmission shaft and, on the other hand, to the third element of the epicyclic train by means of the variable-slip device.

3. Arrangement according to claim 1, wherein each of the variable-slip devices is a passive system.

4. Arrangement according to claim 1, wherein each of the variable-slip devices is an active system.

5. Arrangement according to claim 1, wherein said range of variation of the speeds is between 0 and 10% of the maximum rotational speed of the two transmission shafts.

6. Arrangement according to claim 2, wherein each of the variable-slip devices is a passive system.

7. Arrangement according to claim 2, wherein each of the variable-slip devices is an active system.

8. An arrangement for driving in rotation two transmission shafts of a motor driven road vehicle, each connected to a wheel of the same axle, comprising: each of said two transmission shafts is connected to the engine unit of the vehicle by means of a device allowing a variable rotational slip between its input member and its output member and means for controlling each of the two variable slip devices which regulate the rotational speed of the two transmission shafts in order to keep these speeds within a specific range of relative variation, wherein each of said two transmission shafts is associated with an epicyclic train, a first element of which is connected to the engine unit and a second element of which is connected, on the one hand, directly to the transmission shaft and, on the other hand, to the third element of the epicyclic train by means of the variable slip device.

9. Arrangement according to claim 8, wherein each of the variable-slip devices is a passive system.

10. Arrangement according to claim 8, wherein each of the variable-slip devices is an active system.

11. Arrangement according to claim 8, wherein said range of variation of the speeds is between 0 and 10% of the maximum rotational speed of the two transmission shafts.

12. An arrangement for driving in rotation two transmission shafts of a motor-driven road vehicle, each connected to a wheel of the same axle, comprising: each of the two transmission shafts is connected to the engine unit of the vehicle by means of a device allowing a variable rotational slip between its input member and its output member, and means for controlling each of the two variable-slip devices which regulate the rotational speeds of the two transmission shafts in order to keep these speeds within a specified range of relative variation, wherein said range of variation of the speeds is between 0 and 10% of the maximum rotational speeds of the two transmission shafts.

13. Arrangement according to claim 12, wherein each of the variable-slip devices is a passive system.

14. Arrangement according to claim 12, wherein each of the variable-slip devices is an active system.

* * * * *